United States Patent
Baudisch et al.

(10) Patent No.: US 7,502,480 B2
(45) Date of Patent: Mar. 10, 2009

(54) SYSTEM AND METHOD FOR IMPLEMENTING A FLAT AUDIO VOLUME CONTROL MODEL

(75) Inventors: Patrick M. Baudisch, Seattle, WA (US); Sumit Basu, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 938 days.

(21) Appl. No.: 10/880,842

(22) Filed: Jun. 30, 2004

(65) Prior Publication Data

US 2005/0043831 A1     Feb. 24, 2005

Related U.S. Application Data

(60) Provisional application No. 60/496,337, filed on Aug. 19, 2003.

(51) Int. Cl.
  *H03G 3/00*   (2006.01)
(52) U.S. Cl. .................... 381/104; 381/107; 700/94
(58) Field of Classification Search ............ 700/94; 381/104, 109, 106
  See application file for complete search history.

(56) References Cited

U.S. PATENT DOCUMENTS

| | | | |
|---|---|---|---|
| 6,026,169 A * | 2/2000 | Fujimori | 381/61 |
| 6,954,675 B2 * | 10/2005 | Chu et al. | 700/94 |
| 6,996,445 B1 * | 2/2006 | Kamijo | 700/94 |
| 7,251,337 B2 * | 7/2007 | Jacobs | 381/107 |
| 2002/0029088 A1 * | 3/2002 | Yamada et al. | 700/94 |
| 2004/0013277 A1 * | 1/2004 | Crocitti et al. | 381/109 |

* cited by examiner

*Primary Examiner*—Vivian Chin
*Assistant Examiner*—Disler Paul
(74) *Attorney, Agent, or Firm*—Amin, Turocy & Calvin, LLP

(57) ABSTRACT

A system and method for implementing a flat volume model for software application audio signals is provided. A computer system generates a flat volume characteristics tree based upon current hardware/software values from an audio setting hierarchy. The computer system processes the flat volume characteristics tree and converts the optimized values into new audio hierarchy settings. The computer system can generate user interfaces representative of the flat volume settings for the software application. Adjustments to the flat volume settings result in modification to the flat volume characteristics tree and the audio setting hierarchy.

37 Claims, 18 Drawing Sheets

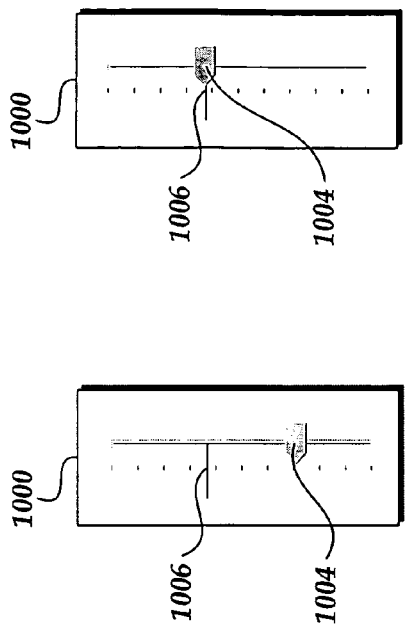
*Fig.10A.*
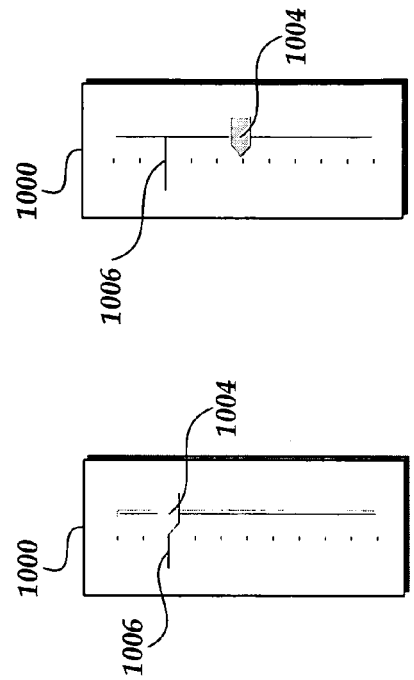
*Fig.10B.*
*Fig.10C.*
*Fig.10D.*
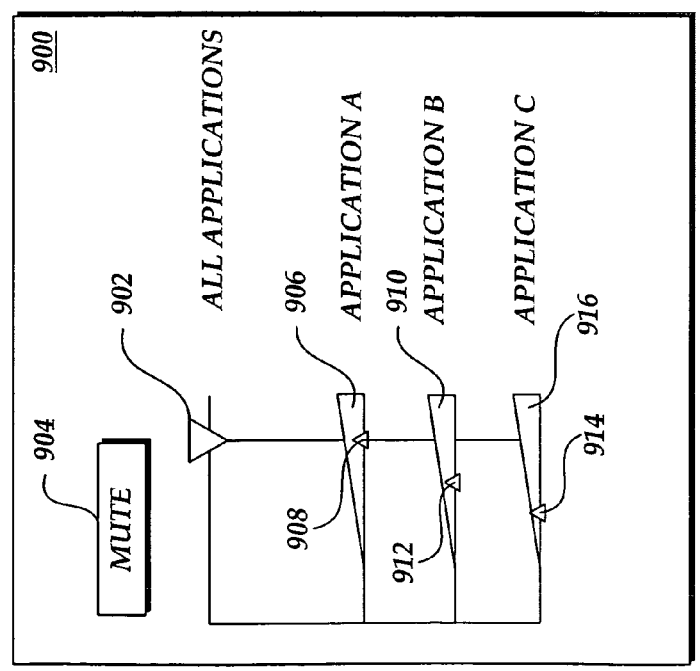
*Fig.9.*

US 7,502,480 B2

SYSTEM AND METHOD FOR IMPLEMENTING A FLAT AUDIO VOLUME CONTROL MODEL

CROSS-REFERENCE TO RELATED APPLICATION

This application claims the benefit of U.S. Provisional Application No. 60/496,337, entitled Flat Audio Control Model, filed on Aug. 19, 2003, with the inventor being Patrick M. Baudisch. U.S. Provisional Application No. 60/496,337 is incorporated by reference herein.

FIELD OF THE INVENTION

In general, the present invention relates to computer software and user interfaces, and in particular, to a system and method implementing a flat audio volume control model in a computer system.

BACKGROUND OF THE INVENTION

Generally described, a variety of computer software applications output audio data as part of the function of the software application. Examples of software applications outputting audio data include multi-media software applications for playing various media, presentation software applications for generating audio data as part of a presentation, and other software applications that generate some type of audio signal as part of a user interaction. In one typical computing system environment, audio signals from the software applications are processed along various stages in a computer system before reaching the speakers and being converted to sound audible by a user. The various stages in the computer system can be thought of as an audio setting hierarchy having one or more levels. Each level in the audio setting hierarchy corresponds to a volume setting control that can have an impact on the overall volume of audio signals generated by a software application. Accordingly, the overall output volume of the audio signals generated by a software application corresponds to the product of the volume settings for each level of the audio setting hierarchy.

FIG. 1 is a block diagram illustrative of a set of conventional user interfaces for manipulating audio hierarchy settings in a computer system. As illustrated in FIG. 1, a first audio setting control corresponds to a volume control setting at the software application level. A second audio setting control corresponds to a mute control also at the software application level. The first and second audio setting controls are typically associated with user interface display 100 associated with the particular software application generating the audio signals. In an illustrative example, the first and second control can be represented as a slider bar 102 for adjusting the volume setting and mute control 104 on the display 100. Further, although the first and second audio setting controls 102 and 104 are illustrated as being associated with a particular software application, these controls may be omitted from software applications.

With continued reference to FIG. 1, a third audio setting control 108 corresponds to a volume control on a channel level for processing all audio signals generated by all the instantiated software applications. A fourth audio setting control 110 corresponds to a mute control for the same channel level as the third audio setting control 108. In one audio setting hierarchy, this level is often referred to as channel volume. There may be multiple channels, and each of them may carry a different name, such as "wave channel." The third and fourth audio setting controls 108, 110 are typically not directly associated with any particular software application and would be used to cumulatively control the overall output volume of audio signals from all the software application. As illustrated in FIG. 1, the third and fourth audio setting controls are typically associated with some type of centralized user interface display 106 and can be represented as a slider bar 108 for adjusting the volume setting and mute control 110 on the display.

With still continued reference to FIG. 1, a fifth audio setting control 112 corresponds to a main volume setting processing all audio signals generated by all the channels in the software application. In a typical audio setting hierarchy, this level is often referred to as a main volume or master volume. A sixth audio setting control 114 corresponds to a mute control for the same main volume level as the fifth audio setting control 114. Similar to the third and fourth audio setting controls, the fifth and sixth audio setting controls are typically not directly associated with any particular software application and are used to adjust volume setting for all audio channels being processed by a computer system. As illustrated in FIG. 1, the fifth and sixth audio setting controls are typically associated with some type of centralized user interface display 106 and can be represented as a slider bar 112 for adjusting the volume setting and mute control 114 on the display.

One skilled in the relevant art will appreciate that a user manipulation of any one of the six illustrated audio setting controls can effect the overall output volume of a particular software application's audio signals. Accordingly, regardless of the number of levels in the typical audio setting hierarchy, no one control has the effect of offering full control of the overall output volume of the particular software application's audio signals. While each control can reduce the overall output volume, controls cannot increase output volume beyond the limitations set by the other controls. In particular, if a "mute" or "zero volume" control is being utilized, adjusting any other volume controls will show no effect. Additionally, in many situations, a computer user may have multiple software applications instantiated at one time such that the multiple software applications are capable of generating audio signal data. In order to obtain the maximal output volume for any application affected by the wave channel, the user has to maximize the volume settings of that channel. However, a user manipulation of some of the audio setting controls can also have the undesirable effect of modifying the overall output volume of audio signals of the other software applications. For example, a user manipulation of the third or fourth audio setting controls (e.g., the wave channel controls) would have the effect of adjusting the overall output volume of all the software applications audio signals being processed through the wave channel. Because so many audio settings controls can effect the overall output volume of the software application audio signals, users often cannot determine which audio setting control will achieve a desired result. For example, a user may manipulate the volume slide bars of a main audio control, channel audio control and software application volume control to increase overall output volume only to discover that one of the mute controls is negating the settings of the volume slide bars. Accordingly, the current set of interfaces for controlling audio setting controls can be inefficient in presenting a user with a representation of audio signal overall output volume for a software application and for controlling audio signal overall output volume for multiple software applications.

Thus, there is a need for a system and method for modeling audio signal overall output volume as product of various audio settings controls.

SUMMARY OF THE INVENTION

A system and method for implementing a flat volume model for software application audio signals is provided. A computer system generates a flat volume characteristics tree based upon current hardware/software values from an audio setting hierarchy. The computer system optimizes the flat volume characteristics tree and converts the optimized values into new audio hierarchy settings. The computer system can generate user interfaces representative of the flat volume settings for the software application. Adjustments to the flat volume settings result in modification to the flat volume characteristics tree and the audio setting hierarchy.

In accordance with an aspect of the present invention, a method for managing system audio settings is provided. The method may be implemented in a system having one or more software applications for generating audio signals. The system can also include an audio setting hierarchy for processing audio signals from one or more software applications. In accordance with the method, a system generates a system audio settings control corresponding to a processing of audio signals from a first software application through the audio setting hierarchy. The system obtains a user manipulation of the first software application system audio settings control. Additionally, the system adjusts one or more audio settings in the audio setting hierarchy corresponding to the user manipulation of the system audio settings control.

In accordance with another aspect of the present invention, a method for managing system audio settings is provided. The method may be implemented in a system having one or more software applications for generating audio signals. The system can also include an audio setting hierarchy for processing audio signals from the one or more software applications. In accordance with the method, a system generates a flat volume characteristics tree based upon current hardware volume settings. The system obtains a user manipulation of a first software application system audio settings control. The first software application system audio settings control corresponds to a processing of audio signals from the first software application through the audio setting hierarchy. The system then modifies the flat volume characteristics tree according to the user input and adjusts the hardware volume settings based on the flat volume characteristics tree.

In accordance with a further aspect of the present invention, a method for managing system audio settings is provided. The method may be implemented in a system having one or more software applications for generating audio signals. The system can also include an audio setting hierarchy for processing audio signals from the one or more software applications. In accordance with the method, a system generates a centralized audio control display including a general software application audio setting control and a system audio settings control for a first software application. The system audio settings control for the first software application corresponds to a processing of audio signals from the first software application through the audio setting hierarchy. The system then obtains a user indication to adjust the audio settings of the first software application and adjusts one or more audio settings in the audio setting hierarchy corresponding to the user indication to adjust the audio settings of the first software application.

In accordance with still a further aspect of the present invention, a method for managing a global variable setting is provided. A system generates a global variable control corresponding to a processing of an input signal from a first software application through the variable hierarchy. The system obtains a user manipulation of the first software application system global variable control. Additionally, the system adjusts one or more variable values in the variable hierarchy corresponding to the user manipulation of the global variable control.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 9 is a block diagram illustrative of an alternative embodiment for a centralized audio control display including a general software application audio setting control and a number of system audio settings controls for software applications in accordance with the present invention; and FIGS. 10A-10D are block diagrams illustrative of an alternative embodiment for displaying various audio control value indicators in an application control in accordance with the present invention;

DETAILED DESCRIPTION OF THE PREFERRED EMBODIMENT

Generally described, the present invention relates to a system and method for modeling software application audio signal overall output volume, referred to generally as a flat volume model. More specifically, the present invention relates to a system and method for implementing a flat volume model for software applications in an audio setting hierarchy. The present invention can correspond to a determination of flat volume settings representative of audio signal overall output volume and for the optimization of hardware/software settings in an audio setting hierarchy corresponding to the flat volume settings. Additionally, another aspect of the present invention relates to various user interfaces for representing a flat volume model of software application audio signals. Although the present invention will be described with regard to an illustrative audio setting hierarchy, audio setting values, various user interfaces and user interactions, one skilled in the relevant art will appreciate that the disclosed embodiments are illustrative in nature and should not be construed as limiting.

One skilled in the relevant art will appreciate that aspect of the present invention can be implemented in a computer system that includes one or more software applications including some form of a user interface. The computer systems can correspond to a wide variety of computing devices, such as personal computers, server-based computers, hand-held computers, mobile computers, personal digital assistants, mobile telephones, audio processing equipment (such as mixers and sampling devices), and the like. Further, as explained above, the software applications included in the computer system can correspond to software applications that include an explicit control that allows users to manipulate volume settings. Additionally, the software applications included in the computer system can also correspond to software application that generate audio signals, but do not include an explicit control for allowing users to manipulate volume settings.

Figure 1:
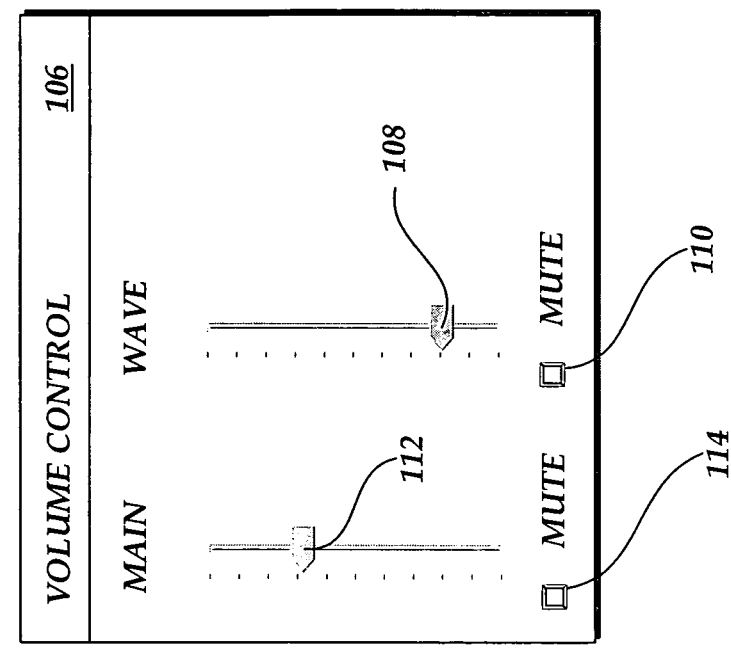
FIG. 1 is a block diagram illustrative of a conventional set of user interfaces for manipulating various audio setting hierarchy values in a computer system.
Figure 1:
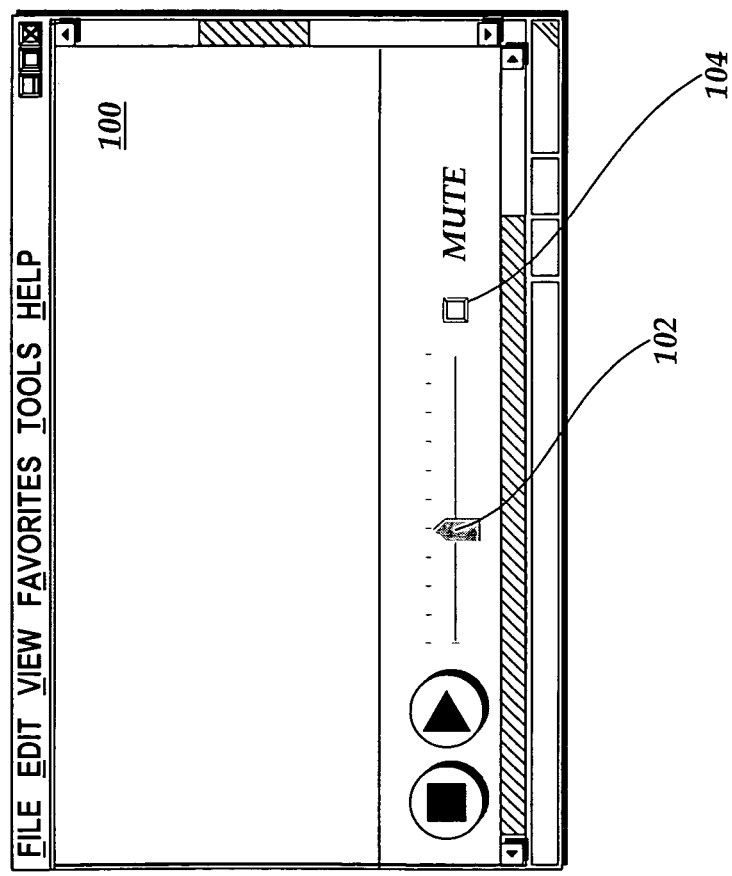
Figure 2:
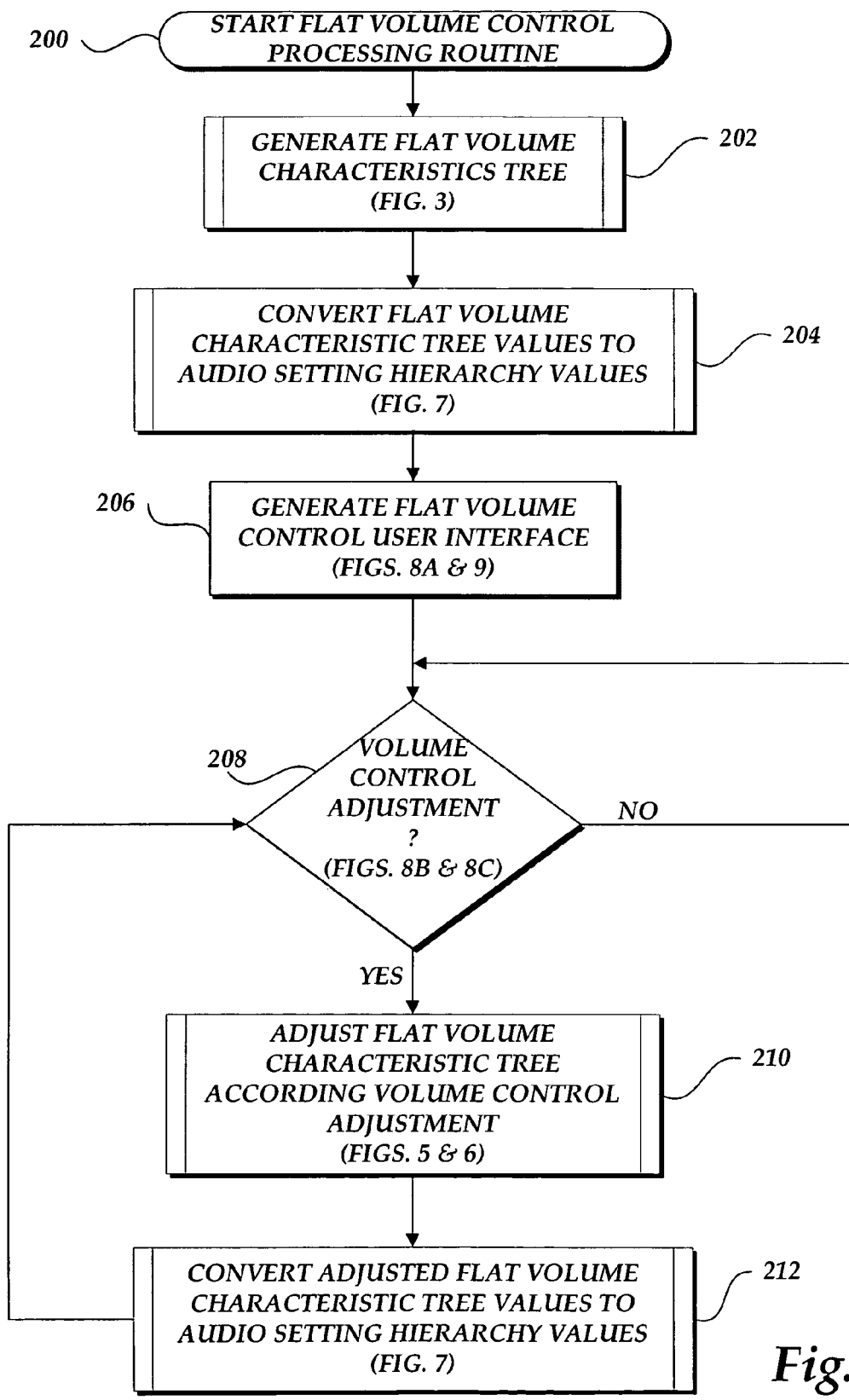
FIG. 2 is a flow diagram illustrative of a flat volume control processing routine implemented by a computer system in accordance with the present invention.

FIG. 2 is a flow diagram illustrative of a flat volume control processing routine 200 implemented by a computer system for implementing a flat volume framework for software application audio signals in accordance with the present invention. At block 202, the computer system generates a flat volume characteristics tree. As will be explained in greater detail, a flat volume characteristics tree is a tree structure based upon a computer system audio setting hierarchy. As will be explained below, the initial values of nodes within the flat volume characteristics tree correspond to a current hardware/software volume settings in the computer system audio setting hierarchy.

Figure 3:
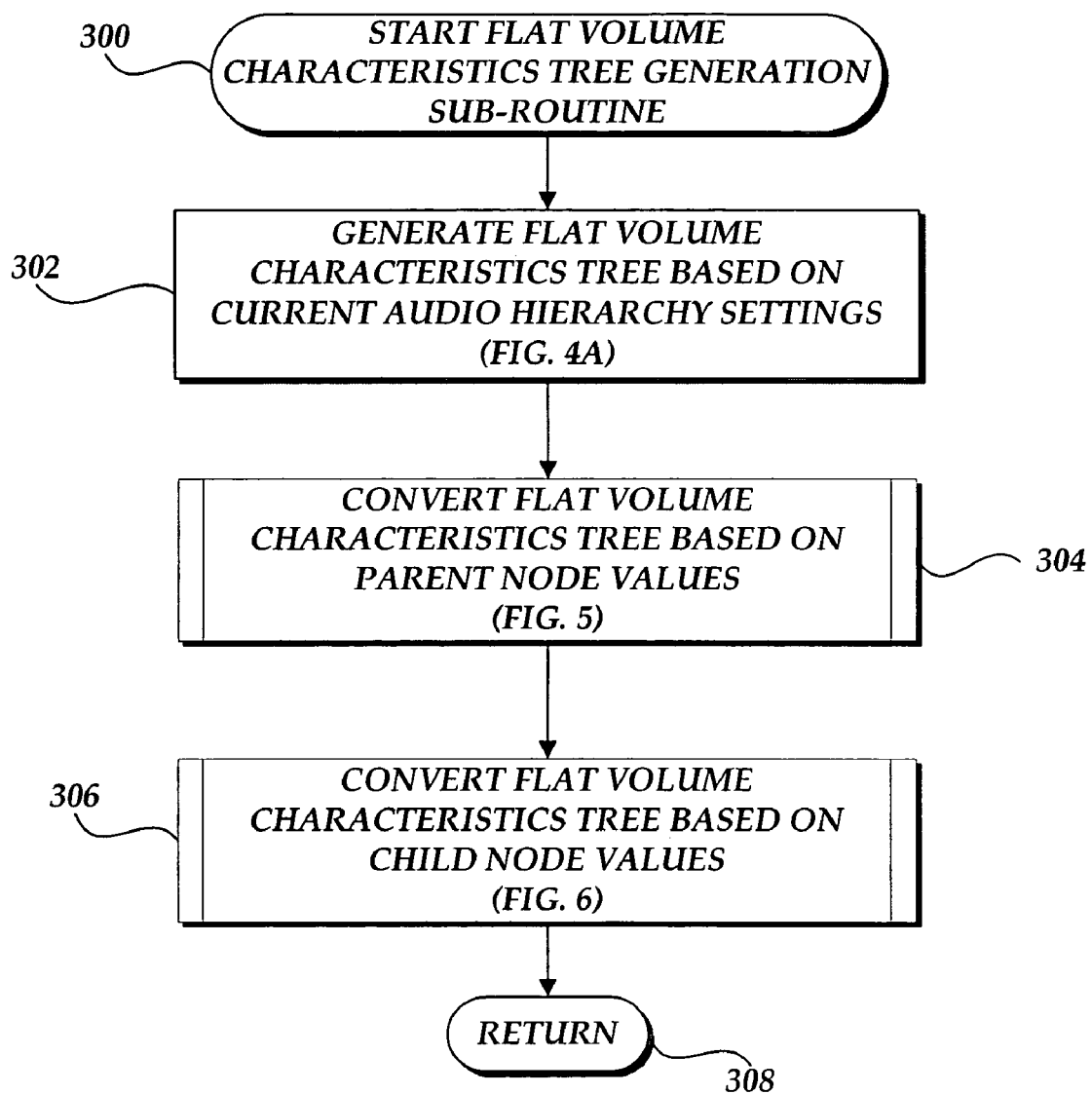
FIG. 3 is a flow diagram illustrative of a flat volume characteristics tree generation sub-routine implemented by a computer system in accordance with the present invention.
Figure 4A:
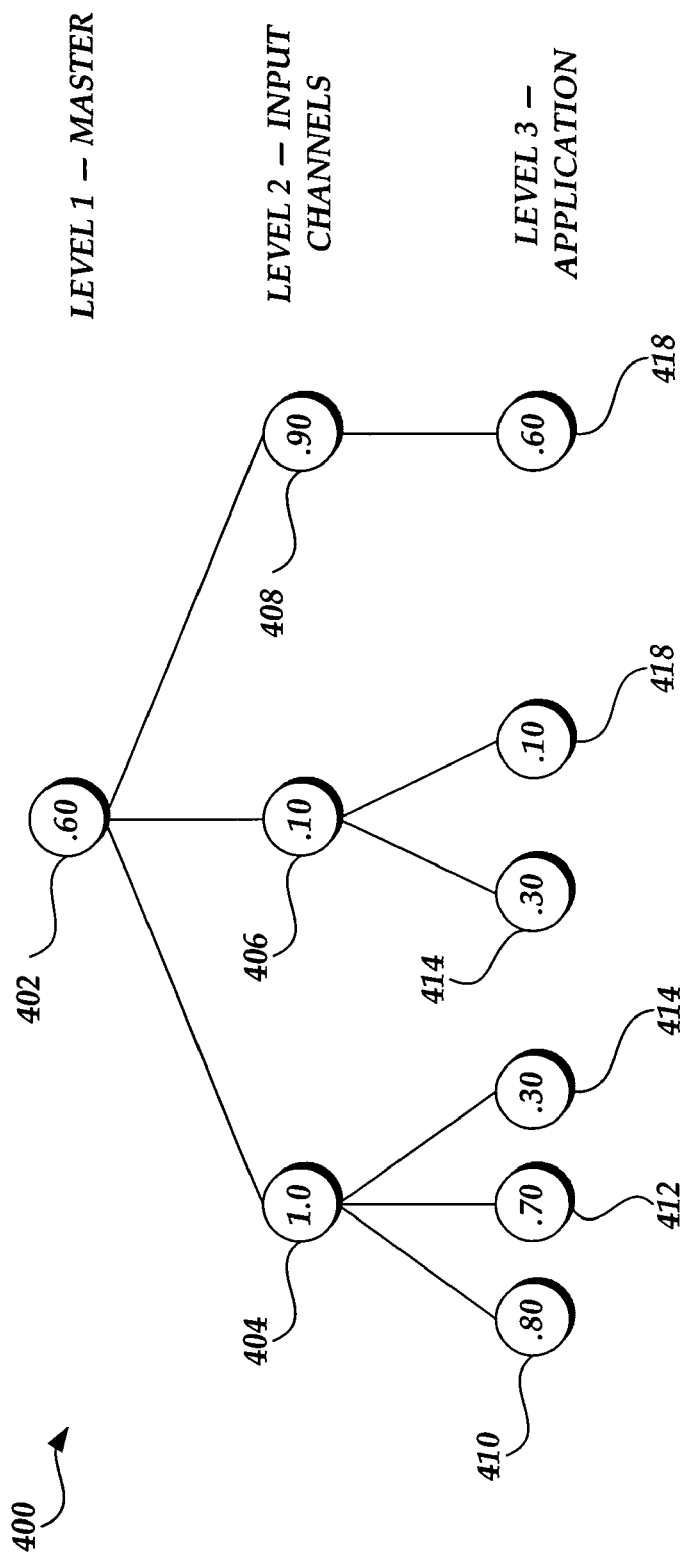
FIGS. 4A-4G are block diagrams illustrative of various iterations of a flat volume characteristics tree generated in accordance with the present invention.

FIG. 3 is a flow diagram illustrative of a flat volume characteristics tree generation sub-routine 300 implemented by a computer system in accordance with the present invention and corresponding to block 202 of FIG. 2. At block 302, the computer system generates a flat volume characteristics tree based upon current volume control settings. One skilled in the relevant art will appreciate that volume control setting values can be represented as a percentage of the volume signal that is passed through each volume control. For example, a volume control setting of 100% would pass all of the volume signals, while a volume control setting of 0% would not pass any volume signals. FIG. 4A is a block diagram of a three-level flat volume characteristics tree 400 corresponding to current volume control setting values. A first level in the tree includes a top node 402 corresponding to a main volume control setting. In an illustrative embodiment of the present invention, the value of the top node 402 corresponds to the current volume control setting for the main volume. Further, the value of the top node 402 can also reflect the setting of a mute control with a "0" value when the mute control is instantiated.

Figure 4B:
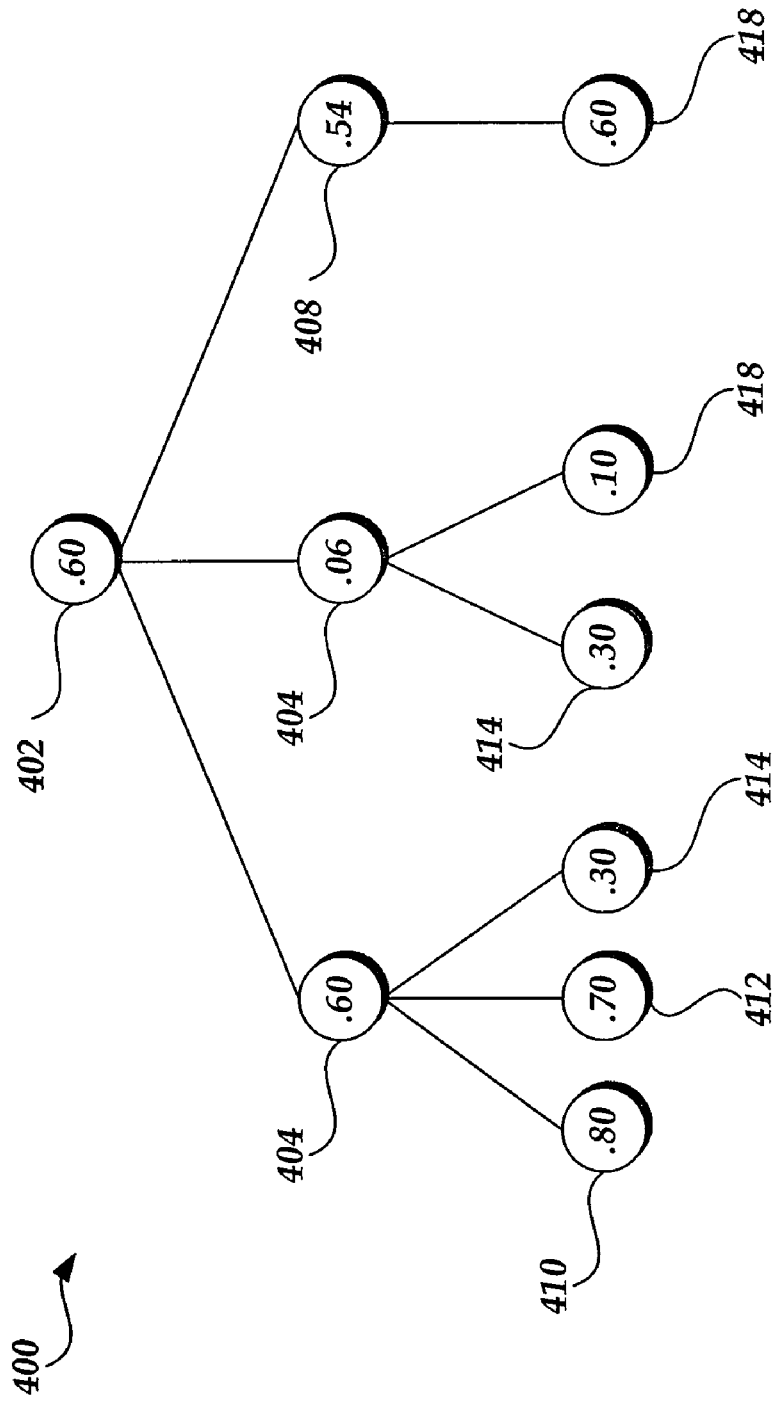

The flat volume characteristics tree 400 can also include a second level corresponding to input channels and including three nodes 404, 406, 408. Similar to the top node 402, the value of the nodes 404, 406, and 408 corresponds to the current setting for the volume controls at the respective input channels. Further, the value of the value of nodes 404, 406, and 408 can also reflect the setting of a mute control at each respective input channel. With continued reference to FIG. 4A, the flat volume characteristics tree 400 also includes a third level corresponding to software application volume settings and including six nodes 410, 412, 414, 416, 418 and 420. Nodes 410, 412, 414, 416, 418 and 420 are leaf nodes of the flat volume characteristics tree 400 and include a value corresponding to a current setting for a volume setting at each respective software application, which can include a mute control value. As illustrated in FIG. 4A, nodes 410, 412, 414, 416, 418 and 420 are leaf nodes and have no children. FIG. 4B is the block diagram of FIG. 4A including illustrative values for each node in the flat volume characteristics tree 400 for purposes of illustration. One skilled in the relevant art will appreciate that the values shown in nodes 402-420 are illustrative in nature and will be used to illustrate various processes in accordance with the present invention. Additionally, one skilled in the relevant art will appreciate that a computer system may have any number of levels within an audio setting hierarchy. Accordingly, the flat volume characteristics tree would have a corresponding number of levels. Further, in the event that a software application would not include an application level volume control, the flat volume characteristic tree would not include a node at the corresponding level for the particular software application.

Figure 5:
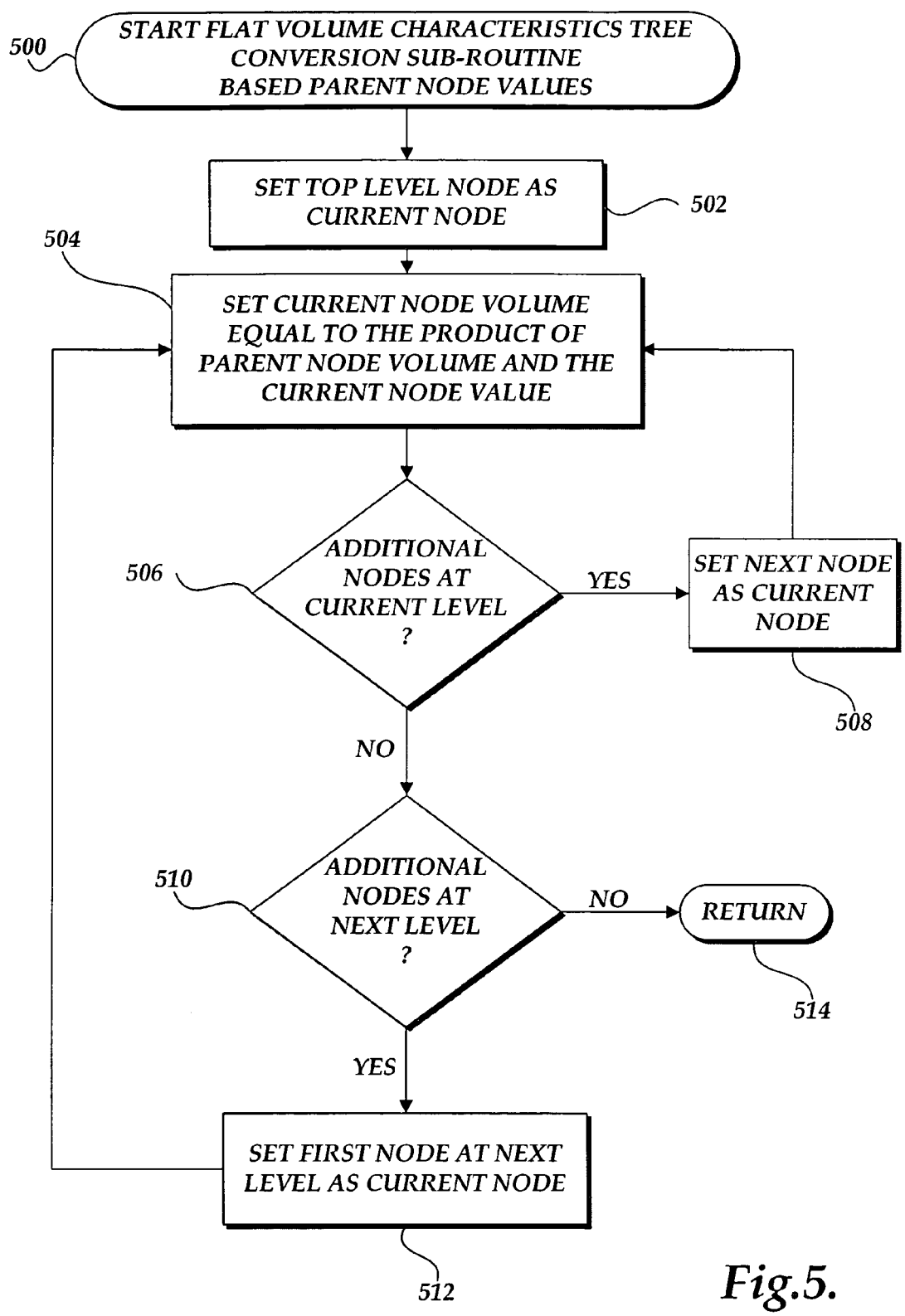
FIG. 5 is a flow diagram illustrative of a flat volume characteristics tree conversion sub-routine based on parent node values in accordance with the present invention.
Figure 6:
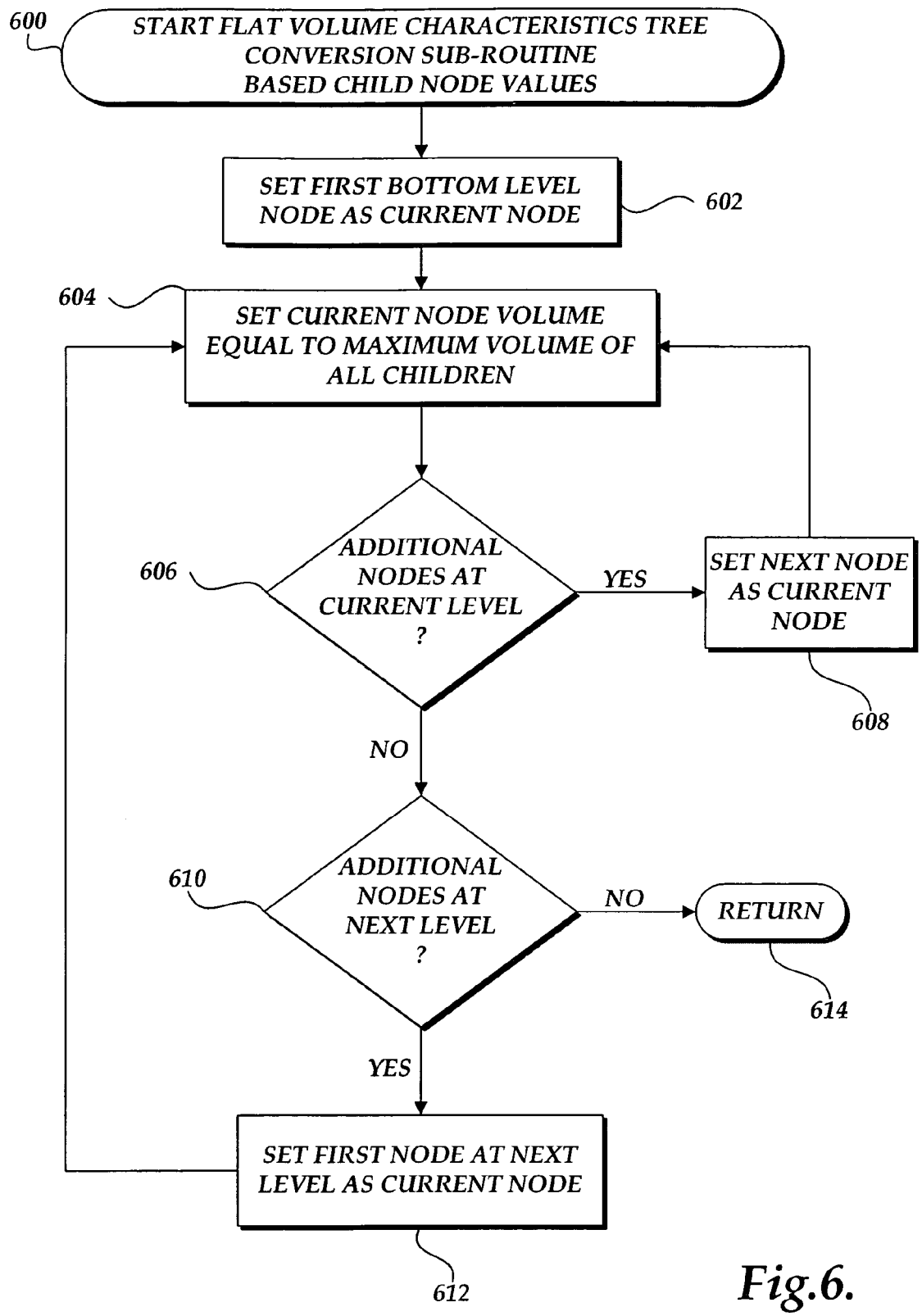
FIG. 6 is a flow diagram illustrative of a flat volume characteristics tree conversion sub-routine based on child node values in accordance with the present invention.

Returning to FIG. 3, the computer system begins converting the flat volume characteristic tree values from the current hardware audio setting hierarchy values to a flat volume model. At block 304, the computer system converts the flat volume characteristics tree 400 according to parent node values. The conversion of the flat volume characteristics tree 400 based upon parent node values will be described below with regard to sub-routine 500 (FIG. 5). At block 306, the computer system continues the conversion process by converting the flat volume characteristics tree 400 based upon child node values. The conversion of the flat volume characteristics tree 400 based upon child node values will be described below with regard to sub-routine 600 (FIG. 6). Upon completion of the conversion, the sub-routine 300 returns.

FIG. 5 is a flow diagram illustrative of a flat volume characteristic tree conversion sub-routine 500 based upon parent node values implemented by a computer system in accordance with the present invention. More specifically, sub-routine 500 corresponds to a top-down flat volume characteristics tree conversion sub-routine. At block 502, the top-level node is set as a current node for processing. At block 504, the current node value is set equal to the product of the current node value and the value of a parent node. At decision block 506, a test is conducted to determine whether additional nodes exist the current level of the flat volume characteristics tree 400. If additional nodes exist at the current level, at block 508, the next node at the current level is set as the current node and the sub-routine 500 returns to block 504.

If no additional nodes exist at the current level, at decision block 510, a test is conducted to determine whether any additional nodes exist at the next level of the flat volume characteristics tree 400. If nodes exist at the next level, at block 512, the first node at the next level of the flat volume characteristics tree 400 is set as the current node and the sub-routine 500 returns to block 504. Alternatively, if no additional nodes exist at the next level of the flat volume characteristics tree 400, the sub-routine 500 returns at block 514.

Figure 4C:
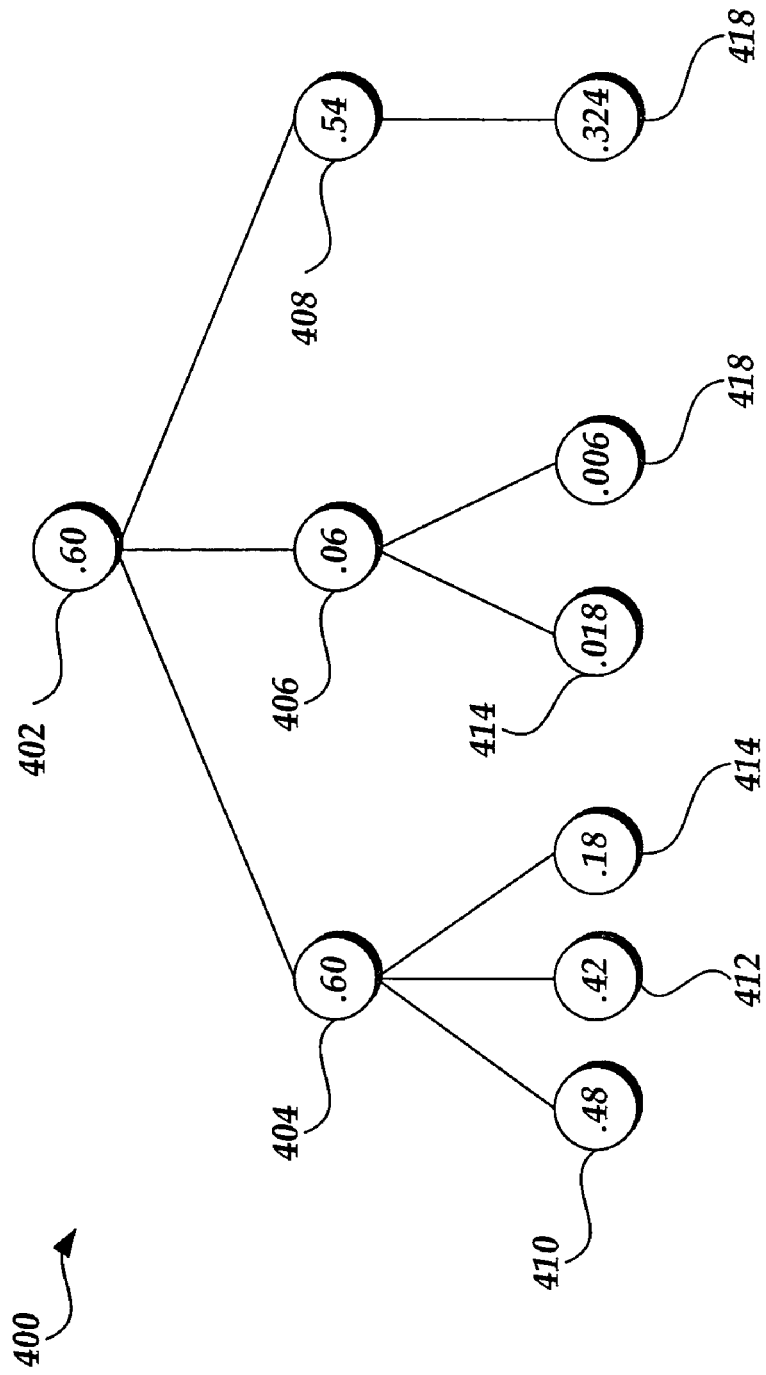

FIGS. 4B and 4C are block diagrams of the flat volume characteristics tree 400 illustrating two iterations of sub-routine 500. As illustrated in FIG. 4B, the values of nodes 404, 406 and 408 have been replaced by the value of the product of the node and their parent node 402. With reference to FIG. 4C, in a second iteration of sub-routine 500, the values of nodes 410, 412, 414, 416, 418 and 420 have been replaced by the product of the node and their respective parent nodes 404, 406, and 408. Because no other levels remain in the flat volume characteristics tree 400, the sub-routine 500 returns.

FIG. 6 is a flow diagram illustrative of a flat volume characteristic tree conversion sub-routine 600 based upon child node values implemented by a computer system in accordance with the present invention. More specifically, sub-routine 600 corresponds to a bottom-up flat volume characteristics tree conversion sub-routine. At block 602, the bottom level node is set as a current node for processing. At block 604, the current node value is set equal to the maximum value of all child nodes of the current node. At decision block 406, a test is conducted to determine whether additional nodes exist the current level of the flat volume characteristics tree 400. If additional nodes exist, at block 408, the next node at the current level is set as the current node and the sub-routine 600 returns to block 604.

If no additional nodes exist at the current level, at decision block 610, a test is conducted to determine whether any additional nodes exist at the next level of the flat volume characteristics tree 400. If nodes exist at the next level, at block 612, the first node at the next level of the flat volume characteristics tree 400 is set as the current node and the sub-routine 600 returns to block 604. Alternatively, if no additional nodes exist at the next level of the flat volume characteristics tree 400, the sub-routine 600 returns at block 614.

Figure 4D:
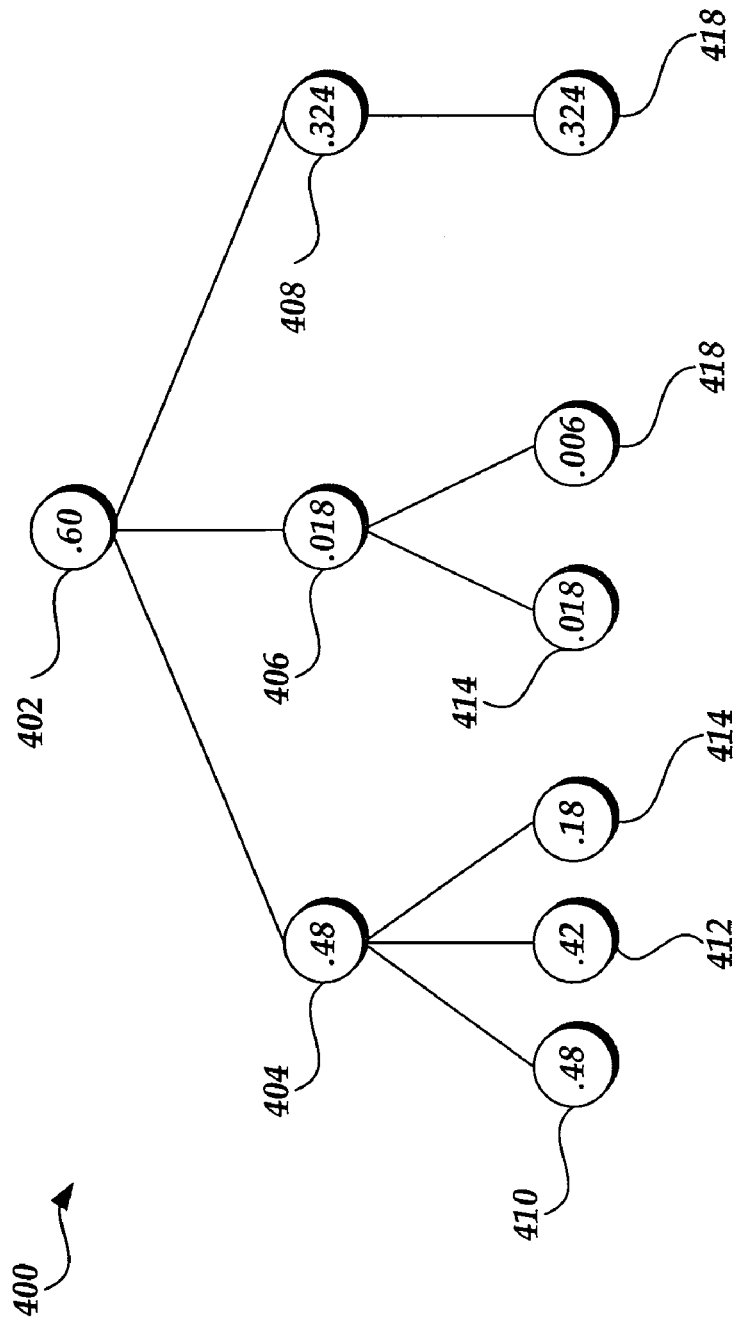
Figure 4E:
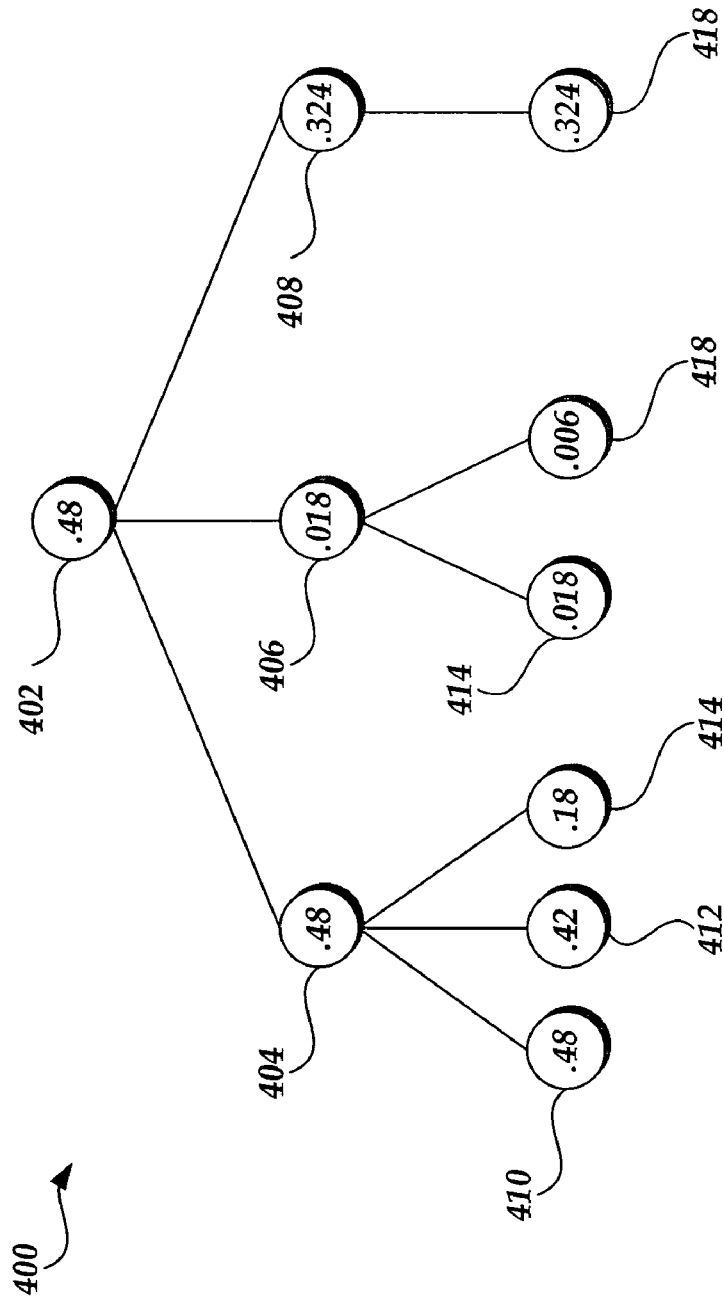

FIGS. 4D and 4E are block diagrams of the flat volume characteristics tree 400 illustrating two iterations of sub-routine 600. As illustrated in FIG. 4D, the value of node 404 has been replaced by the maximum value of its children nodes, namely, node 410. Similarly, the value of nodes 406 and 408 have been replaced by the maximum value of their children nodes. With reference to FIG. 4E, in a second iteration of sub-routine 600, the value of node 602 has been replaced by the maximum value of its children, namely, node 604. Because no additional levels have nodes, the sub-routine 600 returns.

Returning to FIG. 2, once the flat volume characteristics tree 400 has been generated and converted at block 202, the overall output volume for each software application can be represented by a flat volume setting control. In an illustrative embodiment of the present invention, the flat volume setting corresponds to the value of each leaf node in the flat volume characteristics tree 400 (FIG. 4). However, because flat volume settings do not correspond directly to hardware/software audio settings in an audio setting hierarchy, at block 204, new audio hierarchy setting values are generated based on the flat volume characteristics tree.

Figure 7:
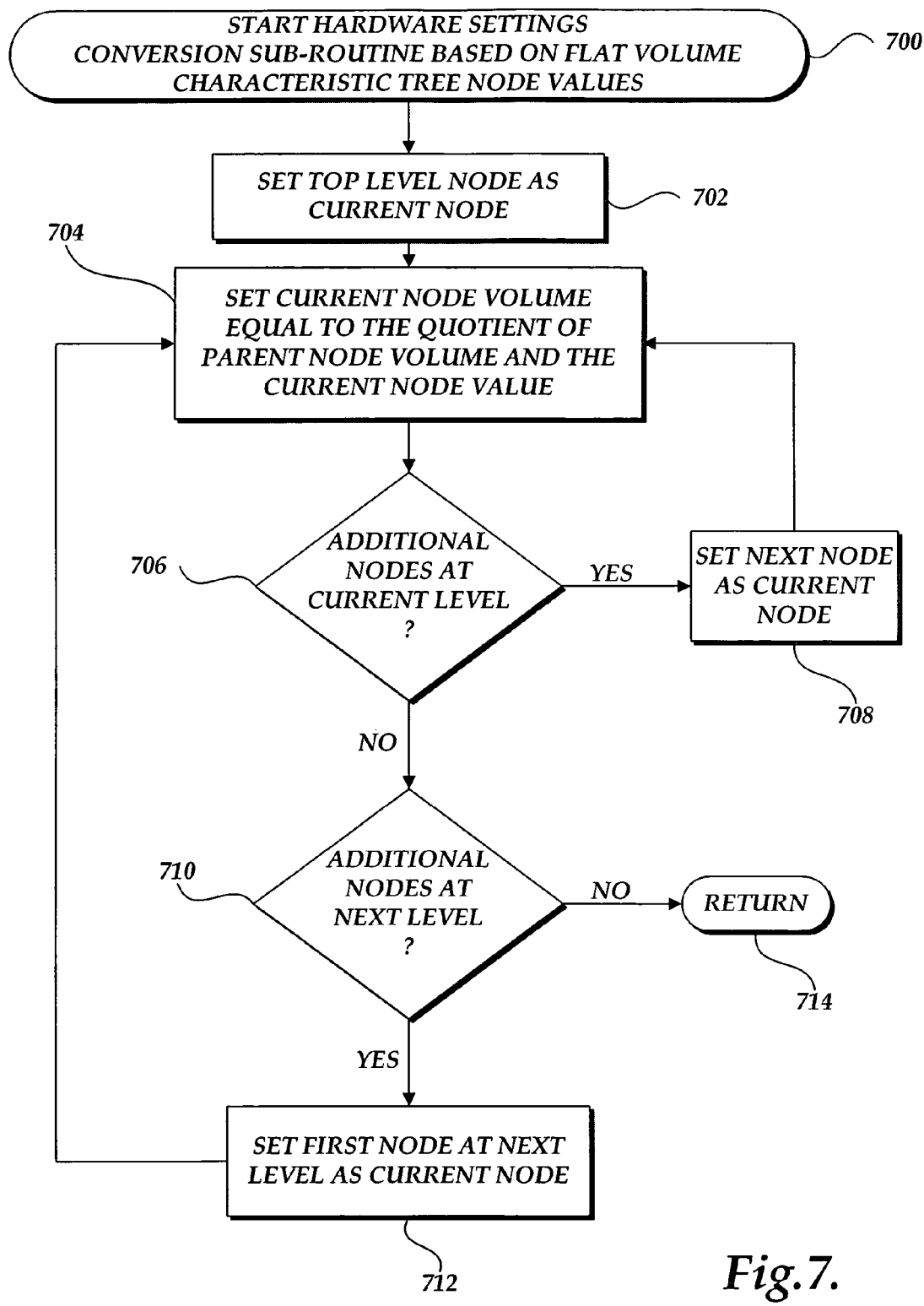
FIG. 7 is a flow diagram illustrative of a flat volume characteristics tree to hardware audio setting hierarchy conversion sub-routine in accordance with the present invention.

FIG. 7 is a flow diagram illustrative of a flat volume characteristics tree to hardware audio setting hierarchy conversion sub-routine 700 implemented by a computer system in accordance with the present invention. More specifically, sub-routine 700 corresponds to a top-down audio setting hierarchy conversion sub-routine that maps flat volume characteristics tree node values to the audio setting hierarchy. At block 702, the top-level node is set as a current node for processing. At block 704, the current node value is set equal to the quotient of the current node value and the value of a parent node. At decision block 706, a test is conducted to determine whether additional nodes exist the current level of the flat volume characteristics tree. If additional nodes exist at the current level, at block 708, the next node at the current level is set as the current node and the sub-routine 700 returns to block 704.

If no additional nodes exist at the current level, at decision block 710, a test is conducted to determine whether any additional nodes exist at the next level of the flat volume characteristics tree. If nodes exist at the next level, at block 712, the first node at the next level of the flat volume characteristics tree is set as the current node and the sub-routine 700 returns to block 704. Alternatively, if no additional nodes exist at the next level of the flat volume characteristics tree, the sub-routine 700 returns at block 714.

Figure 4F:
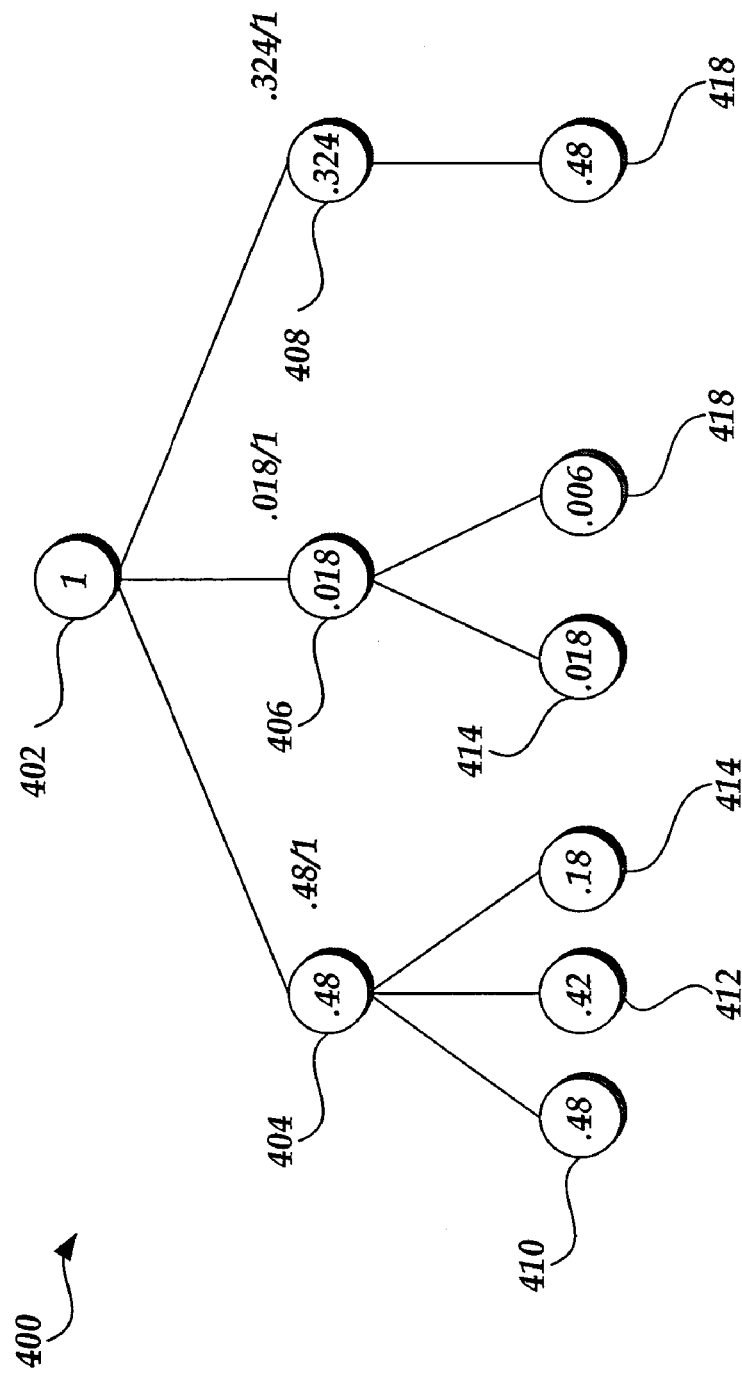
Figure 4G:
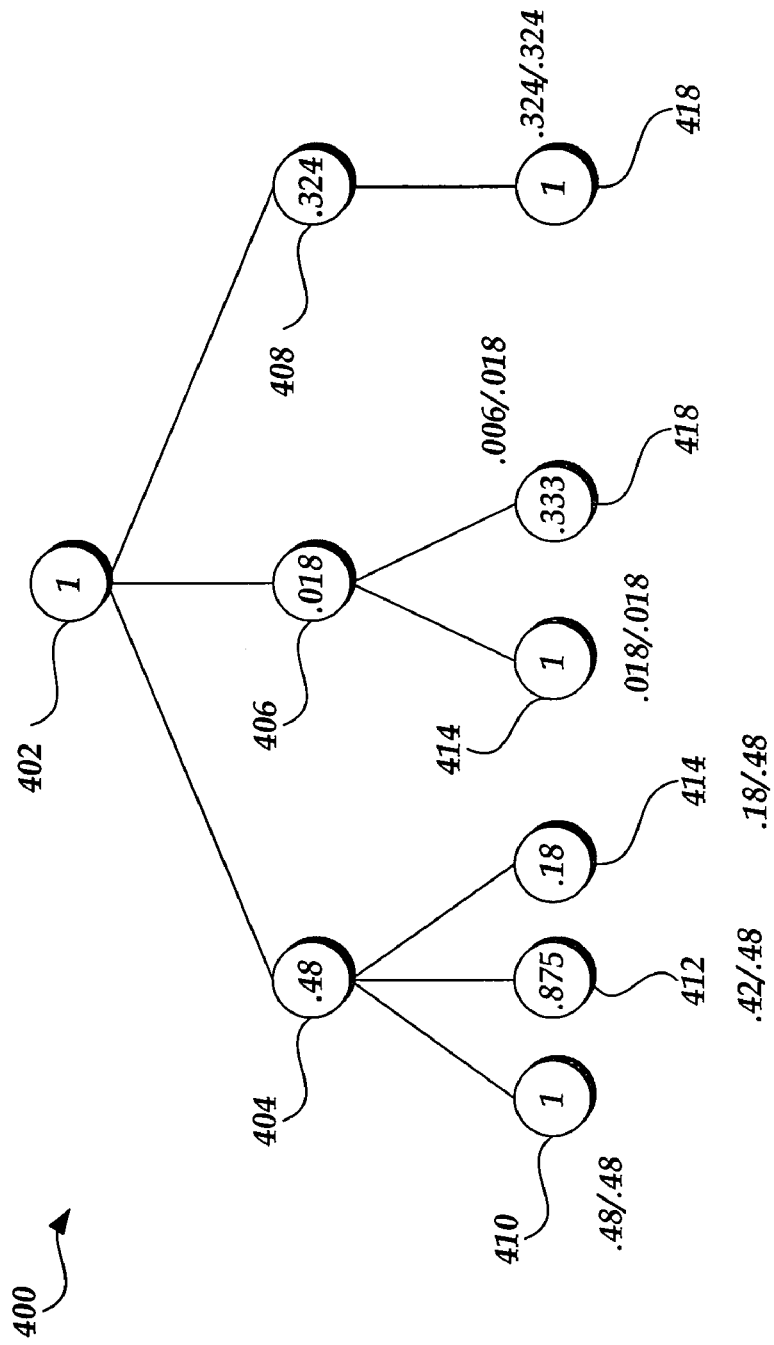

FIGS. 4F and 4G are block diagrams of the flat volume characteristics tree 400 illustrating two iterations of sub-routine 700. As illustrated in FIG. 4E, the value of node 402 has been modified to "1" since it is the top node and does not have a parent node. Additionally, the values of nodes 404, 406 and 408 have been replaced by the value of the quotient of the node and their parent node 402. With reference to FIG. 4E, in a second iteration of sub-routine 700, the values of nodes 410, 412, 414, 416, 418 and 420 have been replaced by the quotient of the node and their respective parent nodes 404, 406, and 408. Because no other levels remain in the flat volume characteristics tree 400, the sub-routine 700 returns.

Returning again to FIG. 2, at block 206, the computer system generates one or more user interfaces representative of a flat volume control for a software application. In an illustrative embodiment of the present invention, a flat volume control for a software application corresponds to a single volume setting control corresponding to the overall output volume of the audio signals generated by the software application. The flat volume control does not necessarily correspond to any volume setting on a traditional computer audio setting hierarchy. In one embodiment of the present invention, the flat volume control can be included in one or more screen displays associated with a software application. The location of the flat volume control can be similar where a conventional software application volume setting control would have been located. In another embodiment of the present invention, the flat volume control can be located in a centralized volume control display for controlling flat volume settings for a number of software applications.

Figure 8A:
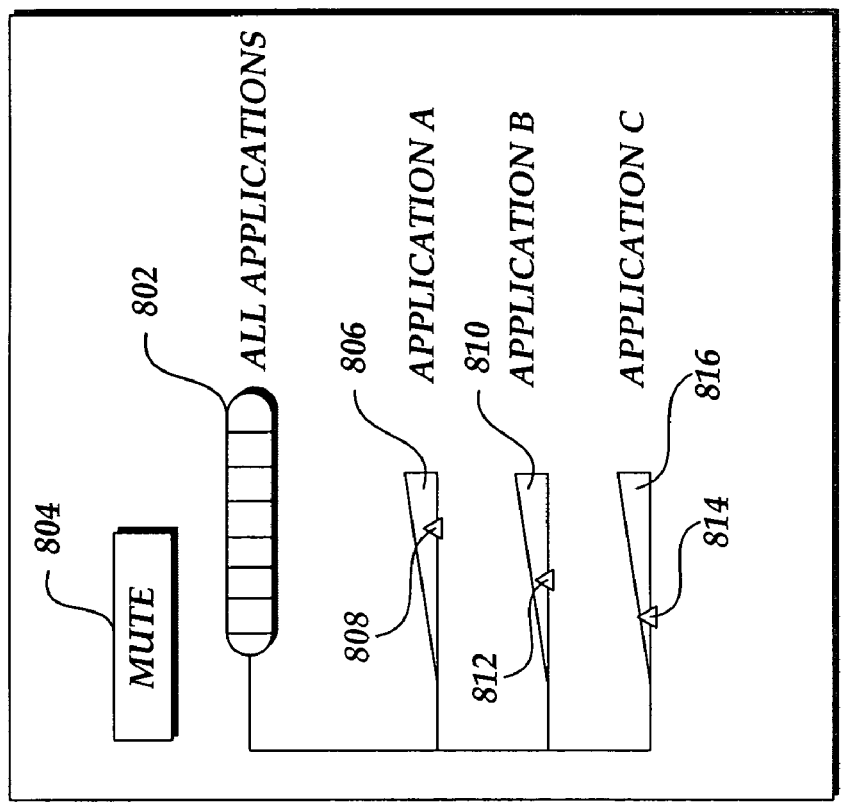
FIGS. 8A-8C are block diagrams illustrative of various embodiments of a centralized audio control display including a general software application audio setting control and a number of system audio settings controls for software applications in accordance with the present invention.

FIG. 8A is a block diagram illustrative of a centralized audio control display 800 including generated by a computer system in accordance with the present invention. The centralized audio control display 800 includes a first general software application audio setting control 802 for manipulating the flat volume control settings of multiple software applications. In an illustrative embodiment of the present invention, the first general software application audio setting control 802 is in the form of a dial that can manipulated by a user to increase or decrease flat volume control settings. As illustrated in FIG. 8A, as a dial, the first general software application audio setting control 802 is not indicative of any particular volume state. The centralized audio control display 800 also includes a second general software application audio setting control 804 for controlling a mute function for all flat volume control settings of the multiple software applications. In an illustrative embodiment of the present invention, the second general software application audio setting control 804 can correspond to any user interface that allows a user to select or deselect the control.

The centralized audio control display 800 also includes a number of additional displays for tracking flat volume control settings for various software applications on the computer system. The software applications may correspond to instantiated software applications, favorite software applications, recently instantiated software applications, and any other selected software application. As illustrated in FIG. 8A, the flat volume setting controls for three software applications are represented on the centralized audio control display 800. Each representation includes a slider bar 806, 710 and 716 indicative of the possible range for the flat volume of the software application and indicators 808, 712 and 814 of the current flat volume setting of the software application. One skilled in the relevant art will appreciate that the current state of the flat volume setting could be represented in a number of ways.

Returning again to FIG. 2, once the flat volume settings for various software applications have been modeled and represented in a user interface, the routine 200 enters into a repeating loop to detect modification of a flat volume setting and adjust hardware settings accordingly. As illustrated in FIG. 2, at decision block 208, a test is conducted to determine whether a flat volume control has been adjusted. In one embodiment of the present invention, the flat volume control of an individual software application may be adjusted by a user manipulation of the flat volume slider corresponding to the particular software application. Additionally, the flat volume controls of multiple software applications may be adjusted by manipulating the general software application audio setting controls 802, 804, which will be described in greater detail below. One skilled in the relevant art will appreciate that an adjustment of a flat volume indicator, such as the in the user interfaces described below, would result in the modification of the value for the node representing the particular software application in the flat volume characteristics tree 400.

If no adjustments are detected, the routine 200 loops back to decision block 208. Alternatively, if a flat volume adjustment is detected, at block 210, the computer system adjusts the flat volume characteristics tree 400 according to the detected adjustment. In an illustrative embodiment of the present invention, the adjustment of the flat volume characteristics tree 400 can correspond to the optimization of the entire flat volume characteristics tree as illustrated in sub-routine 500 and sub-routine 600. Alternatively, in another embodiment of the present invention, the adjustment of the flat volume characteristics tree can correspond to a partial processing of the branches of the tree affected by a modified flat volume characteristic node value. Once the flat volume characteristics tree 400 has been adjusted, at block 212, the computer system adjusts the audio setting hierarchy in accordance with the values of the adjusted flat volume characteristics tree. In an illustrative embodiment of the present invention, sub-routine 700 may be implemented to determine any new audio setting hierarchy values. The sub-routine 200 then returns to decision block 210 to detect any new flat volume control setting adjustments.

Figure 8B:
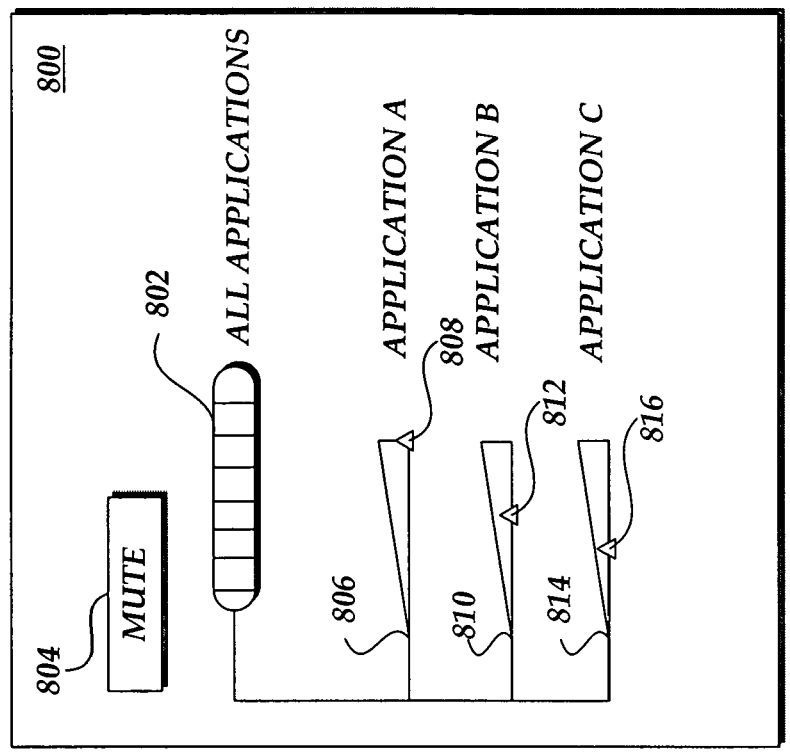
Figure 8B:
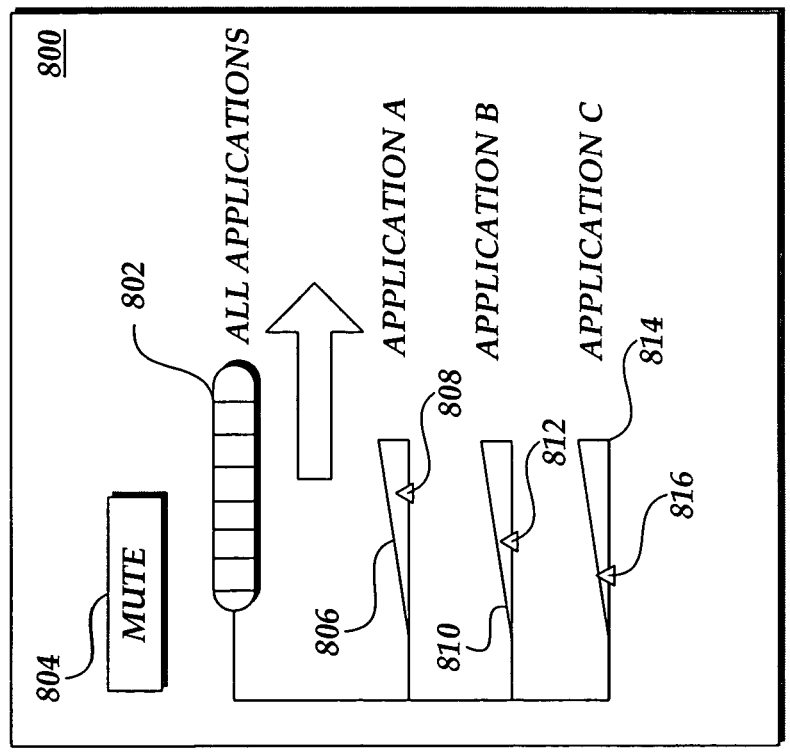
Figure 8C:
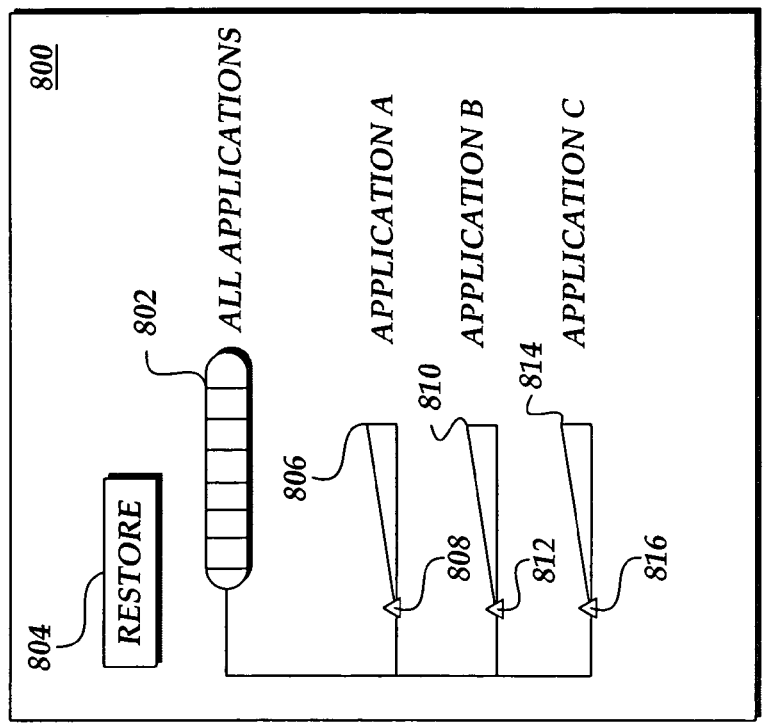
Figure 8C:
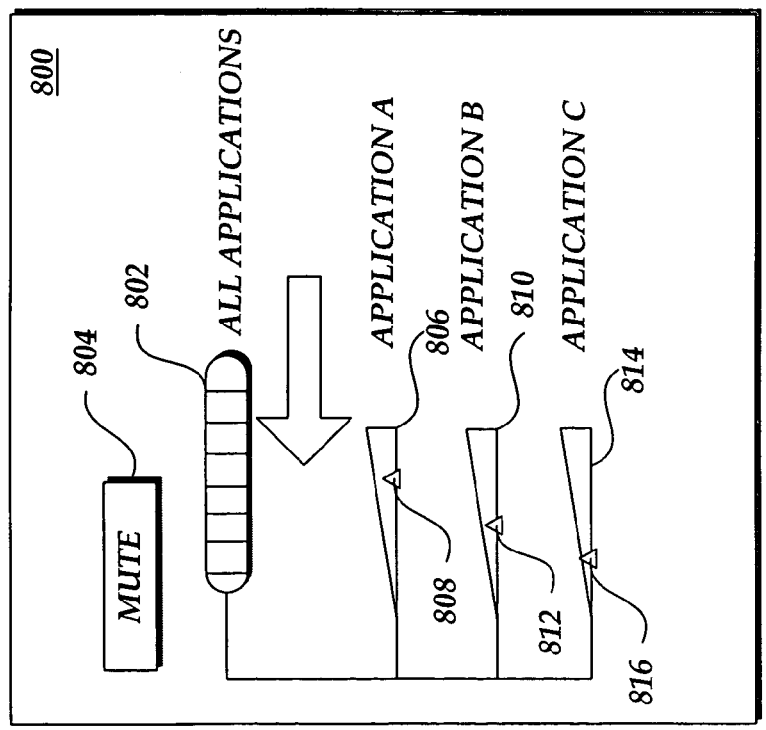

With reference now to FIGS. 8B & 8C, embodiments for adjusting multiple software application flat volume controls via the general software application audio setting controls 802, 804 will be described. With reference to FIG. 8B, to increase flat volume controls settings, the first general software application audio setting control 802 can be manipulated in a direction designated for positive increase in flat volume control settings. In an illustrative embodiment of the present invention, a user may utilize a user input device, such as a mouse, to cause the dial to rotate in a direction. The rotation of the dial may cause the dial to rotate a pre-defined distance, such as a number of steps. Alternatively, the rotation may be continuous.

In an illustrative embodiment of the present invention, the distance of rotation of the general software application audio setting control 802 causes the indicators 808, 812 and 816 to move in the same direction. The movement of the indicators 808, 812 and 816 can correspond to certain percentage of their respective previous values. For example, a movement of one increment of the dial 802 would correspond to an equal increase in value for highest indicator, indicator 808. If the movement of indicator 808 corresponded to an increase by a factor of X, then other indicators 812 and 816 would move so as to represent a growth by the same factor X. Alternatively, the movement of the indicators 808, 812 and 816 may correspond to some different percentage, greater or lesser, of the movement of dial 802. For example, a movement/rotation of the dial 802 of two increments may only correspond to a movement of the indicators 808, 812, 816 by a single increment.

In an illustrative embodiment of the present invention, all of the indicators 808, 812, 816 move a proportional distance, relative to each other, with each rotation of the general software application audio setting control 802. For example, the movement of dial 802 may correspond to an equal movement of indicator 808. If value of the indicator 808 was increased by 40%, the values of indicators 812 and 816 would be increased by 40%. Still further, in illustrative embodiment of the present invention, once one of the indicators has reached a threshold value, such as a maximum value, the further increase of indicator values by the rotation of the general software application audio setting control 802 is prohibited to maintain the relative difference of flat volume settings between the software application indicators 808, 812, and 816. Alternatively, the other indicators may continue to move until they individually reach a maximum value.

With reference to FIG. 8C, to decrease flat volume controls settings, the first general software application audio setting control 802 can be manipulated in a direction designated for negative increase in flat volume control settings. Similar to FIG. 8B, in an illustrative embodiment of the present invention, a user can manipulate the first general software application audio setting control 802 to cause each flat volume indicator 808, 812 and 816 to decrease accordingly. Additionally, a user can manipulate the second general software application audio setting control 804 to cause all the indicators 808, 812, and 816 to automatically decrease to zero value. In an illustrative embodiment of the present invention, the first general software application audio setting control 802 can continue to be turned in a direction for decreasing flat volume control settings until all the indicators reach a zero value. Additionally, in an illustrative embodiment of the present invention, once all the indicators 808, 812, and 816 reach a zero value mark, the second general software application audio setting control 804 can be modified to allow a user to restore the indicator values to the last non-zero setting.

FIG. 9 is a block diagram illustrative of an alternative embodiment for a centralized audio control display 900 for manipulating flat volume controls. Similar to centralized audio control display 800, the centralized audio control display 900 includes a number of displays for tracking flat volume control settings for various software applications on the computer system. Each representation includes a slider bar 906, 910 and 916 indicative of the possible range for the flat volume of the software application and indicators 908, 912 and 914 of the current flat volume setting of the software application. Additionally, the centralized audio control display 900 includes a first and second general software application audio setting control 902, 904 for controlling the flat volume control settings for the software applications. In an illustrative embodiment of the present invention, the first general software application audio setting control 902 is in the form of a volume slider bar. The indicator of the volume slider bar corresponds to the maximum value of all the indicators 908, 912 and 916 in the centralized audio control display 900. However, as described above, manipulation of the first and second general software application audio setting controls can result in the adjustment of the individual indicators 908, 912, and 916.

FIGS. 10A-10D are block diagrams illustrative of an alternative embodiment for representing various audio setting control values in individual application volume controls in accordance with the present invention. In accordance with this embodiment, an application may implement a flat volume implementation in an operating system that does not support flat volume controls. With reference to FIG. 10A, an individual software application volume control can be represented on a graphical user interface 1000 as a slider control 1004. The graphical user interface 1000 may correspond to an interface associated only with the software application. Alternatively, the interface may correspond to some centralized control. The graphical user interface 1000 also includes a main audio volume indicator 1006 that corresponds to a level for the main audio volume. As illustrated in FIG. 10A, the slider control 1004 is at approximately a 40% maximum of application volume, while the main volume indicator 1006 is at approximately 70% of maximum system volume. Thus, the graphical user interface 1000 represents to the user the application volume level and how it is effected by the main volume setting.

With reference now to FIGS. 10B and 10C, in the event that the slider 1004 is manipulated to reach the level of the main audio volume indicator 1006 (FIG. 10B), an additional manipulation of the slider control 1004 increases the level of the main audio volume indicator 1006 (FIG. 10C). In an illustrative embodiment of the present invention, the increase of the main audio volume indicator 1006 has the effect of increasing the main audio volume settings on the computer system. Accordingly, as illustrated in FIG. 10D, the main audio volume indicator 1006 remains at the new level even if the slider control 1004 is adjusted down. Thus, a user may manipulate the slider control 1004 to adjust application volume as long as the slider control is below the main audio volume indicator 1006. Alternatively, the main audio volume 1006 may decrease when the user drags down the slider control 1004. In the event that the slider control 1004 is adjusted above the main audio indicator 1006, the main audio volume is also adjusted and the overall volume levels for other applications may be effected.

Figure 12:
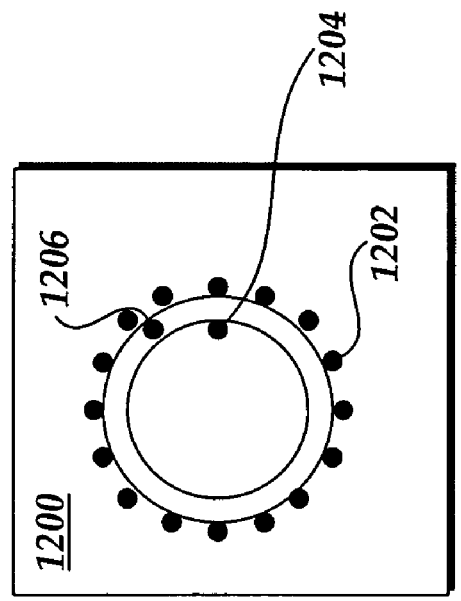
FIG. 12 is a block diagram illustrative of an alternative embodiment for displaying various audio control value indicators in an application control in accordance with the present invention.
Figure 11:
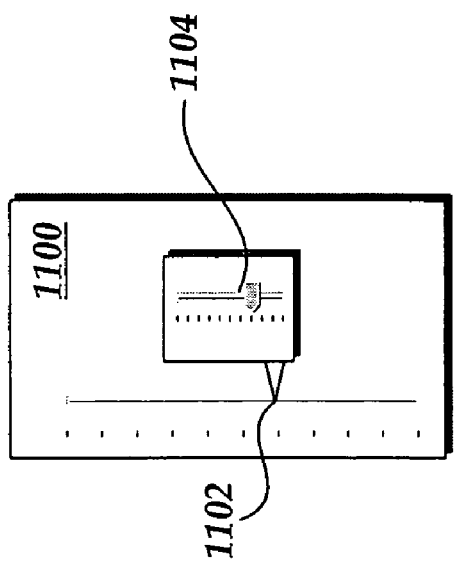
FIG. 11 is a block diagram illustrative of an alternative embodiment for displaying various audio control value indicators in an application control in accordance with the present invention.

With reference now to FIGS. 11 and 12, alternative user interfaces for implementing flat volume controls will be described. With reference to FIG. 11, an alternative user interface 1100 can include two controls for controlling two or more attributes. In accordance with an illustrative embodiment of the present invention, the controls can include a main volume control 1102 that can serve to globally adjust flat volume controls of multiple applications in a manner similar to the general software application audio setting control 802 (FIG. 8). Additionally, the controls can include individual flat volume control 1104 that corresponds to a single software application. In accordance with this illustrative embodiment, the main audio control 1102 may be adjusted along a first audio scale. Additionally, the flat volume control 1104 can be further adjusted along a second scale in a manner that does not affect the main audio control 1102. Alternatively, once the flat volume control 1104 has reached a maximum point or a minimum point, further manipulation of the flat volume control 1104 will result in an adjustment of the main audio control 1102. Although the user interface 1100 is described with regard to a flat volume control model, one skilled in the relevant art will appreciate that the controls may correspond to traditional audio volume controls and/or any type of attribute control.

With reference to FIG. 12, in another alternative user interface 1200 can include two controls for controlling two or more attributes. Similar to user interface 1100 (FIG. 11), the controls can include a main volume control 1202 that can serve to globally adjust flat volume controls of multiple applications. Additionally, the controls can include individual flat volume control 1204 that corresponds to a single software application. In accordance with this illustrative embodiment, the main audio control 1202 and flat volume control 1204 correspond to circular controls that are adjusted similar to turning a dial. The adjustment of the flat volume control 1204 may be implemented in a manner that does not affect the main volume control 1102. Alternatively, once the flat volume control 1204 has reached a maximum point or a minimum point, further manipulation of the flat volume control 1204 will result in an adjustment of the main audio control 1202. Although the user interface 1200 is described with regard to a flat volume control model, one skilled in the relevant art will appreciate that the controls may correspond to traditional audio volume controls and/or any type of attribute control. Further, additional user interfaces may be built by mechanically placing a first dial on top of a second dial.

While illustrative embodiments of the invention have been illustrated and described, it will be appreciated that various changes can be made therein without departing from the spirit and scope of the invention. In one aspect, the present invention may be utilized in conjunction with other hierarchical based variable structures to facilitate control of values within the variable hierarchy through a global variable control. For example, the present invention may be utilized in conjunction with a visual display variable hierarchy, such as a gamma variable correction hierarchy, to facilitate adjustment of various display variable values by manipulation of a global variable display control. Further, additional user interfaces may be built by mechanically placing a first slider on top of a second slider or placing a dial on top of a second dial. Additionally, although some of the user interfaces are illustrated as having a limited number of independent controls, such as FIGS. 11 and 12, one skilled in the relevant art will appreciate that any number of independent controls may be incorporated into the present invention.

The embodiments of the invention in which an exclusive property or privilege is claimed are defined as follows:

1. In a system having one or more software applications for generating audio signals, wherein the system includes an audio setting hierarchy, a method for managing system audio settings, the method comprising causing one or more processors to perform the following acts:

generating a system audio settings control corresponding to a processing of audio signals from a first software application through the audio setting hierarchy, wherein the audio setting hierarchy comprises a plurality of stages of a computer system, wherein the audio signals generated by the one or more software applications are processed within the plurality of stages of the computer system, and wherein a volume setting control of each stage of the computer system impacts the overall volume of audio signals generated by the one or more software applications;

obtaining a user manipulation of the first software application system audio settings control; and adjusting one or more audio settings in the audio setting hierarchy corresponding to the user manipulation of the system audio settings control, wherein adjusting the system audio settings includes:
  generating a flat volume characteristics tree based upon current hardware volume settings prior to the user manipulation by at least:
    generating a hardware characteristics tree corresponding to current hardware volume settings;
    mapping the hardware characteristics tree into a flat volume characteristics tree; and
    optimizing the flat volume characteristics tree by at least performing a top-down replacement of all node values with a product of a value from a parent node and a current value;
  modifying the flat volume characteristics tree according to the user input; and
  adjusting the hardware volume setting based on the flat volume characteristics tree.

2. The method as recited in claim 1, wherein the audio setting hierarchy includes an application volume level corresponding to a volume for audio signals generated by the first software application, a channel volume level for audio signals generated by all software applications in the computer system, and a main volume level for audio signals generated by all audio channels in the computer system.

3. The method as recited in claim 1, wherein the audio setting hierarchy includes an application volume level corresponding to a volume for audio signals generated by the first software application and a main volume level for audio signals generated by all audio channels in the computer system.

4. The method as recited in claim 1, wherein generating the system audio settings control includes generating a system audio settings control on a display corresponding to the first software application.

5. The method as recited in claim 1, wherein generating the system audio settings control includes generating a system audio settings control on a display corresponding to a centralized audio control display.

6. The method as recited in claim 1, wherein the computer system includes a second software application for generating audio signals, the method further comprising:
  generating a system audio settings control corresponding to a processing of audio signals from the second software application through the audio setting hierarchy;
  obtaining a user manipulation of the second software application system audio settings control; and
  adjusting one or more audio setting in the audio setting hierarchy corresponding to the user manipulation of the system audio settings control.

7. The method as recited in claim 6, wherein generating the system audio settings control includes generating a system audio settings control on a display corresponding to the second software application.

8. The method as recited in claim 6, wherein generating the system audio settings control includes:
  generating a system audio settings control corresponding to the first software application on a centralized audio control display; and
  generating a system audio settings control corresponding to the second software application on the centralized audio control display.

9. The method as recited in claim 8 further comprising:
  generating a first general software application audio setting control on the centralized control display;
  obtaining a user manipulation of the first general software application audio setting control;
  adjusting the first software application audio setting control corresponding to the user manipulation; and
  adjusting the second software application audio setting control corresponding to the user manipulation.

10. The method as recited in claim 8 further comprising generating a second general application audio setting control for adjusting all software application volume settings to zero.

11. The method as recited in claim 10 further comprising modifying the second general application audio setting control to restore each software application volume settings to a last non-zero value.

12. The method as recited in claim 8, wherein generating the first general software application audio setting control on the centralized control display includes displaying the first general software application audio setting control as a dial not indicative of any audio setting state.

13. The method as recited in claim 8, wherein generating the first general software application audio setting control on the centralized control display includes displaying the first general software application audio setting control as a marker indicative of a highest volume setting of the first and second software application volume setting.

14. The method as recited in claim 1, wherein optimizing the flat volume characteristics tree includes subsequently performing a bottom-up replacement of all node values with a maximum value from all children nodes.

15. The method as recited in claim 1, wherein adjusting the hardware volume setting based on the flat volume characteristics tree includes performing a top-down replacement of all node values with a quotient of a value from a parent node and a current value.

16. A computer-readable medium having stored thereon computer-executable instructions for performing the method recited in claim 1.

17. In a system having one or more software applications for generating audio signals, wherein the system includes an audio setting hierarchy, a method for managing system audio settings, the method comprising causing one or more processors to perform the following acts:
  generating a flat volume characteristics tree based upon current hardware volume settings by at least:
    generating a hardware characteristics tree corresponding to current hardware volume settings;
    mapping the hardware characteristics tree into a flat volume characteristics tree; and
    optimizing the flat volume characteristics tree by at least performing a top-down replacement of all node values with a product of a value from a parent node and a current node value;
  obtaining a user manipulation of a first software application system audio settings control, wherein the first software application system audio settings control corresponds to a processing of audio signals from the first software application through the audio setting hierarchy, wherein the audio signals generated by the one or more software applications are processed along a plurality of levels of the audio setting hierarchy, and wherein a volume setting control of each level of the audio setting hierarchy impacts the overall volume of audio signals generated by the one or more software applications;
  modifying the flat volume characteristics tree according to the user input; and
  adjusting the hardware volume settings based on the flat volume characteristics tree.

18. The method as recited in claim 17, wherein optimizing the flat volume characteristics tree includes subsequently performing a bottom-up replacement of all node values with a maximum value from all children nodes.

19. The method as recited in claim 17, wherein the hardware characteristics tree includes a first level corresponding to software application volume settings, a second level corresponding to channel volume settings, and a third level corresponding to a main volume setting.

20. The method as recited in claim 17, wherein adjusting the hardware volume setting based on the flat volume characteristics tree includes performing a top-down replacement of all node values with a quotient of a value from a parent node and a current value.

21. A computer-readable medium having stored thereon computer-executable instructions for performing the method recited in claim 17.

22. In a system having one or more software applications for generating audio signals, wherein the system includes an audio setting hierarchy, a method for managing system audio settings, the method comprising causing one or more processors to perform the following acts:
  generating a centralized audio control display including a general software application audio setting control and a system audio settings control for a first software application, wherein the system audio settings control for the first software application corresponds to a processing of audio signals from the first software application through the audio setting hierarchy, wherein the audio setting hierarchy comprises a plurality of stages of a computer system, wherein the audio signals generated by the one or more software applications are processed within the plurality of stages of the computer system, wherein a volume setting control of each stage of the computer system impacts the overall volume of audio signals generated by the one or more software applications; and wherein the overall volume of audio signals generated by the one or more software applications corresponds to a product of volume settings associated with each stage of the computer system;
  obtaining a user indication to adjust the audio settings of the first software application; and
  adjusting one or more audio settings in the audio setting hierarchy corresponding to the user indication to adjust the audio settings of the first software application by at least:
    generating a flat volume characteristics tree based upon current hardware volume settings prior to the user indication by at least:
      generating a hardware characteristics tree corresponding to current hardware volume settings;
      mapping the hardware characteristics tree into a flat volume characteristics tree; and
      optimizing the flat volume characteristics tree by at least performing a top-down replacement of all node values with a product of a value from a parent node and a current node value;
    modifying the flat volume characteristics tree according to the user input; and
    adjusting the hardware volume settings based on the flat volume characteristics tree.

23. The method as recited in claim 22, wherein the audio setting hierarchy includes an application volume level corresponding to a volume for audio signals generated by the first software application, a wave channel volume level for audio signals generated by all software applications in the computer system, and a main volume level for audio signals generated by all audio channels in the computer system.

24. The method as recited in claim 22, wherein obtaining a user indication to adjust the audio settings of the first software application system audio settings control includes obtaining a user manipulation of the first general software application audio setting control.

25. The method as recited in claim 24 further comprising generating a second general application audio setting control on the centralized audio control display for adjusting all software application volume settings to zero.

26. The method as recited in claim 25 further comprising modifying the second general application audio setting control to restore each software application volume settings to a last non-zero value.

27. The method as recited in claim 22, wherein generating a centralized audio control display including a general software application audio setting control and a system audio settings control for a first software application includes displaying the first general software application audio setting control as a dial not indicative of any audio setting state.

28. The method as recited in claim 27, wherein obtaining a user indication to adjust the audio settings of the first software application includes obtaining a user manipulation of the first general software application audio setting control.

29. The method as recited in claim 22, wherein generating a centralized audio control display including a general software application audio setting control and a system audio settings control for a first software application includes displaying the first general software application audio setting control as a marker indicative of a highest volume setting of the first and second software application volume setting.

30. The method as recited in claim 22, wherein optimizing the flat volume characteristics tree includes subsequently performing a bottom-up replacement of all node values with a maximum value from all children nodes.

31. The method as recited in claim 22, wherein adjusting the hardware volume setting based on the flat volume characteristics tree includes performing a top-down replacement of all node values with a quotient of a value from a parent node and a current value.

32. The method as recited in claim 22 further comprising generating a system audio settings control on a display corresponding to the first software application.

33. A computer-readable medium having stored thereon computer-executable instructions for performing the method recited in claim 22.

34. A method for managing a global variable setting, the method comprising causing one or more processors to perform the following acts:
  generating a global variable control corresponding to a processing of an input signal from a first software application through the variable hierarchy;
  obtaining a user manipulation of the first software application system global variable control; and
  adjusting one or more variable values in the variable hierarchy corresponding to the user manipulation of the global variable control, wherein adjusting one or more variable values in the variable hierarchy corresponding to the user manipulation of the global variable control includes:
    generating a flat characteristics tree based upon current variable values prior to the user manipulation, wherein generating a flat characteristics tree based upon current variable values prior to the user manipulation includes:
      generating a variable characteristics tree corresponding to current variable values;
      mapping the variable characteristics tree into a flat characteristics tree; and optimizing the flat characteristics tree, wherein optimizing the flat characteristics tree includes performing a top-down replacement of all node values with a product of a value from a parent node and a current node value;

modifying the flat characteristics tree according to the user input; and adjusting the variable values based on the flat characteristics tree, wherein adjusting the variable values based on the flat characteristics tree includes performing a top-down replacement of all node values with a quotient of a value from a parent node and a current value.

35. The method as recited in claim 34, wherein the variable hierarchy corresponds to an audio settings hierarchy.

36. The method as recited in claim 34, wherein the variable hierarchy corresponds to a video setting hierarchy.

37. The method as recited in claim 34, wherein optimizing the flat characteristics tree includes subsequently performing a bottom-up replacement of all node values with a maximum value from all children nodes.

* * * * *